(12) United States Patent
Saito et al.

(10) Patent No.: US 11,807,800 B2
(45) Date of Patent: Nov. 7, 2023

(54) THERMALLY CONDUCTIVE COMPOSITION

(71) Applicant: MITSUI CHEMICALS, INC., Tokyo (JP)

(72) Inventors: Susumu Saito, Chiba (JP); Masatoshi Sasaki, Tokyo (JP); Tateo Takashima, Ichihara (JP)

(73) Assignee: MITSUI CHEMICALS, INC., Tokyo (JP)

( * ) Notice: Subject to any disclaimer, the term of this patent is extended or adjusted under 35 U.S.C. 154(b) by 916 days.

(21) Appl. No.: 16/305,815

(22) PCT Filed: May 31, 2017

(86) PCT No.: PCT/JP2017/020356
§ 371 (c)(1),
(2) Date: Nov. 29, 2018

(87) PCT Pub. No.: WO2017/209215
PCT Pub. Date: Dec. 7, 2017

(65) Prior Publication Data
US 2021/0253926 A1    Aug. 19, 2021

(30) Foreign Application Priority Data

| May 31, 2016 | (JP) | ................................ 2016-108848 |
| May 31, 2016 | (JP) | ................................ 2016-108849 |
| Jun. 29, 2016 | (JP) | ................................ 2016-128262 |
| Jun. 29, 2016 | (JP) | ................................ 2016-128263 |
| Feb. 21, 2017 | (JP) | ................................ 2017-029779 |
| Feb. 21, 2017 | (JP) | ................................ 2017-029780 |
| Mar. 9, 2017 | (JP) | ................................ 2017-044638 |
| Mar. 9, 2017 | (JP) | ................................ 2017-044639 |

(51) Int. Cl.
| C09K 5/14 | (2006.01) |
| C08K 3/22 | (2006.01) |
| C08L 23/00 | (2006.01) |
| G04B 37/22 | (2006.01) |

(52) U.S. Cl.
CPC .................. C09K 5/14 (2013.01); C08K 3/22 (2013.01); C08L 23/00 (2013.01); *C08K 2003/222* (2013.01); *C08K 2201/001* (2013.01); *G04B 37/225* (2013.01)

(58) Field of Classification Search
CPC ....... C09K 5/14; C08L 23/00; C08L 2205/02; C08L 2207/04; G04B 37/225; C08K 3/013; C08K 2203/2217; C08K 2203/222; C08K 3/08; C08K 3/20; C08K 3/22; C08K 13/02; C08K 5/01; C08K 2201/005; C08K 2201/01; C08K 2201/011

See application file for complete search history.

(56) References Cited

U.S. PATENT DOCUMENTS

| 5,100,930 | A | 3/1992 | Fukui et al. | |
| 5,132,353 | A * | 7/1992 | Wallace | .................... C08K 3/22 524/432 |
| 10,648,750 | B2 * | 5/2020 | Esseghir | ................. C08L 53/00 |
| 11,472,992 | B2 * | 10/2022 | Dehn | ........................ C08K 3/08 |
| 2003/0220432 | A1 * | 11/2003 | Miller | ...................... C08K 3/38 524/439 |
| 2005/0101712 | A1 * | 5/2005 | Miller | ...................... C08K 3/38 524/439 |
| 2009/0286075 | A1 * | 11/2009 | Nakamura | ............ C08L 101/12 428/338 |
| 2015/0232664 | A1 * | 8/2015 | Guo | ........................ C08L 23/02 252/75 |
| 2016/0160044 | A1 * | 6/2016 | Kanaya | .................... C08L 69/00 524/502 |
| 2019/0359875 | A1 * | 11/2019 | Nishio | .................... C09J 201/00 |
| 2022/0243055 | A1 * | 8/2022 | Kim | ......................... C08K 3/22 |
| 2023/0183445 | A1 * | 6/2023 | Ma | ........................ H01M 50/14 429/120 |

FOREIGN PATENT DOCUMENTS

| CN | 101857689 | A | 10/2010 | |
| CN | 102304284 | A | 1/2012 | |
| CN | 102604219 | A | 7/2012 | |
| CN | 104151706 | A | 11/2014 | |
| EP | 3015510 | A1 * | 5/2016 | ............ C08L 101/00 |
| JP | S52-15542 | A | 2/1977 | |
| JP | H02-255743 | A | 10/1990 | |
| JP | H03-200875 | A | 9/1991 | |
| JP | H06-172620 | A | 6/1994 | |
| JP | 2003-187757 | A | 7/2003 | |
| JP | 2006-137867 | A | 6/2006 | |
| JP | 2007-031611 | A | 2/2007 | |
| JP | 2007-084617 | A | 4/2007 | |
| JP | 2010-006959 | A | 1/2010 | |

(Continued)

OTHER PUBLICATIONS

CN 101633787A Derwent Abstracts, to Dong et al., published Jan. 27, 2010 (Year: 2010).*

(Continued)

*Primary Examiner* — Jane L Stanley
(74) *Attorney, Agent, or Firm* — Foley & Lardner LLP

(57) ABSTRACT

Disclosed are a thermally conductive composition that contains 10 to 50 parts by mass of a thermoplastic resin (A) and 50 to 90 parts by mass of a metal oxide (B) such as magnesium oxide (a total of the thermoplastic resin (A) and the metal oxide (B) being 100 parts by mass), and a thermally conductive composition that contains a thermoplastic resin (A) and a metal oxide (B) such as magnesium oxide, in which a modified polyolefin-based wax (C) is further contained in an amount of 0.1 to 20 parts by mass with respect to 100 parts by mass of the thermoplastic resin (A), such thermally conductive compositions being useful for applications such as a container, a piece of tableware, a heat dissipating member, a water-circulating structure material, an electronic device casing, a timepiece exterior material, a tumbler, and a commodity for daily use.

14 Claims, 1 Drawing Sheet

(56) References Cited

FOREIGN PATENT DOCUMENTS

| | | |
|---|---|---|
| JP | 2010-254799 A | 11/2010 |
| JP | 2013-209539 A | 10/2013 |
| JP | 2014-005424 A | 1/2014 |
| JP | 2014-159554 A | 9/2014 |
| JP | 2015-074753 A | 4/2015 |
| JP | 2015-205944 A | 11/2015 |

OTHER PUBLICATIONS

CN 101633787A EPO machine translation, to Dong et al., published Jan. 27, 2010 (Year: 2010).*

International Search Report with English language translation and Written Opinion issued in International Application No. PCT/JP2017/020356 dated Jul. 11, 2017.

* cited by examiner

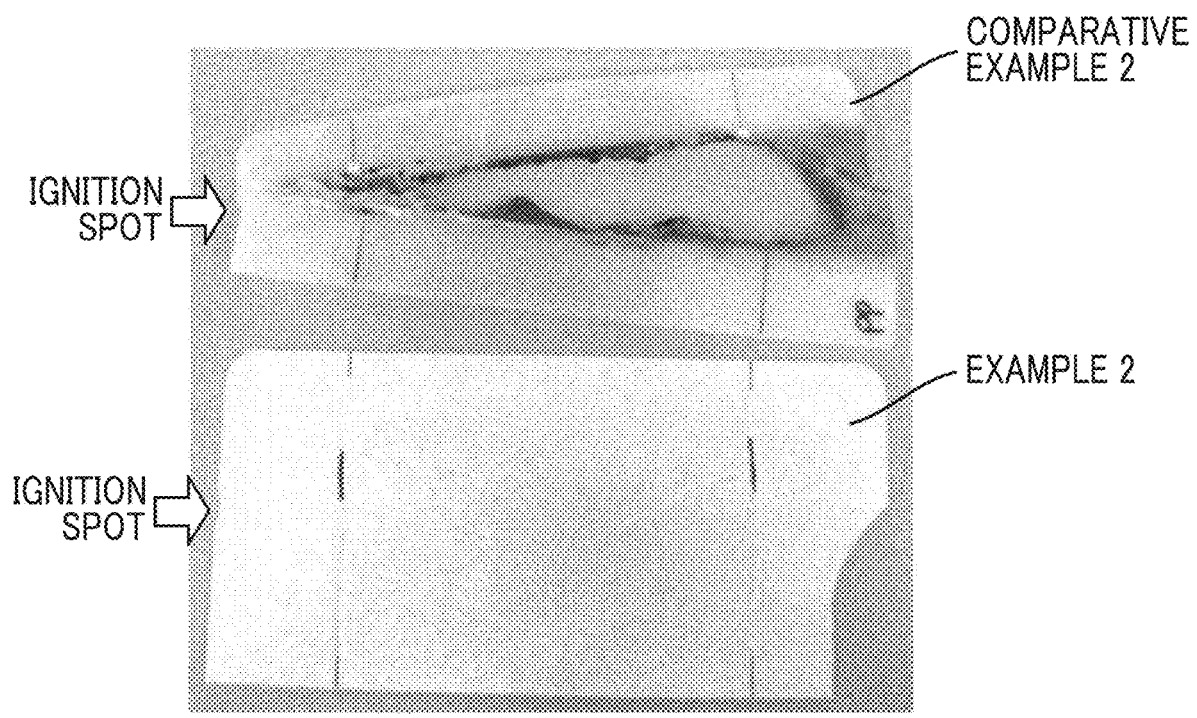

THERMALLY CONDUCTIVE COMPOSITION

RELATED APPLICATIONS

The present application claims priority under 37 U.S.C. § 371 to International Patent Application No. PCT/JP2017/020356, filed May 31, 2017, which claims priority to and the benefit of Japanese Patent Application Nos. 2016-108848 and 2016-108849, both filed on May 31, 2016, 2016-128262 and 2016-128263, both filed on Jun. 29, 2016, 2017-029779 and 2017-029780, both filed on Feb. 21, 2017, and 2017-044638 and 2017-044639, both filed on Mar. 9, 2017. The contents of these applications are hereby incorporated by reference in their entireties.

TECHNICAL FIELD

The present invention relates to a thermally conductive composition containing a thermoplastic resin and a thermally conductive metal oxide, which is useful, for example, for a container, a piece of tableware, a heat dissipating member, and various other applications.

BACKGROUND ART

As compared with a common piece of tableware or container made of ceramics, a piece of tableware or container made of a thermoplastic resin have advantages of being easily moldable by injection molding or the like, and of being hardly broken. In addition, as described below, it has been proposed to add various fillers to a thermoplastic resin for the purpose of improving odor prevention, moldability, physical properties, and the like.

PTL 1 describes a synthetic resin container that contains a synthetic resin (A), and oxide aggregate particles (B) which contain, as main components, one or more elements selected from the group consisting of titanium, aluminum, magnesium, calcium, and silicon, and zinc, for the purpose of solving an odor problem of a resin container.

PTL 2 describes a polyolefin resin composition that contains 80 to 20 parts by mass of a polyolefin resin and 20 to 80 parts by mass of an inorganic filler for the purpose of preventing a sheet from hanging down during vacuum molding of a polyolefin resin, in which specific examples of the inorganic filler also include a metal oxide.

PTL 3 describes a polyester resin having a specific composition and physical properties for the purpose of improving mechanical properties of the polyester resin, lowering a combustion heat value at the time of disposal, and achieving easy disposal, and also describes that a filler such as a metal oxide may be blended in an amount of 10 to 70% by mass with respect to the polyester resin.

PTL 4 describes a thermoplastic resin composition containing 1 to 60% by mass of an inorganic filler for the purpose of achieving increased rigidity, increased heat resistance, improved alkali resistance, and improved surface appearance of resin tableware, in which specific examples of the inorganic filler also include a metal oxide.

CITATION LIST

Patent Literature

[PTL 1] Japanese Patent Application Laid-Open No. 3-200875
[PTL 2] Japanese Patent Application Laid-Open No. 52-15542
[PTL 3] Japanese Patent Application Laid-Open No. 6-172620
[PTL 4] Japanese Patent Application Laid-Open No. 2006-137867

SUMMARY OF INVENTION

Technical Problem

The present inventors have noticed points that in a case where commercialization of a piece of thermoplastic resin tableware or container proceeds, as compared with a piece of tableware or container made of ceramics, the piece of thermoplastic resin tableware or container is difficult to feel a thermal sensation of contents such as a cooked food, is uncomfortable in a case of enjoying meals such as a hot cooked food and a cold drink, and lacks a sense of weight and a sense of stability in a case of being held by hand. Such points are not studied at all in PTLs 1 to 4.

For example, in the synthetic resin container of PTL 1, a blending amount of the oxide aggregate particles (B) which contain, as main components, one or more elements selected from the group consisting of titanium, aluminum, magnesium, calcium, and silicon, and zinc is 0.1% to 20% by mass. With such a small blending amount, a thermal sensation of contents is difficult to feel, and a sense of weight and a sense of stability are also insufficiently exhibited. In addition, since the oxide aggregate particles (B) in PTL 1 are blended simply for solving an odor problem, a blending amount exceeding 20% by mass is not required.

In the polyolefin resin composition of PTL 2, a blending amount of the inorganic filler is 20 to 80 parts by mass at first glance. However, the inorganic filler which is blended in the examples is only talc or kaolin, and a metal oxide having a high thermal conductive property is not actually blended. In addition, as specific examples of the inorganic filler described in PTL 2, talc, kaolin, or the like having a relatively good kneadability with a resin, and a metal oxide or the like having a poor kneadability with a resin are enumerated together. Thus, it is obvious that among blending amounts of the inorganic filler, for example, a blending amount range as much as 50 to 80 parts by mass means a range in a case where talc, kaolin, or the like having a relatively good kneadability with a resin is used. Even in a case where talc or kaolin is blended as in the examples of PTL 2, a thermal sensation of contents is difficult to feel, and a sense of weight and a sense of stability are also insufficiently exhibited. In addition, the inorganic filler in PTL 2 is blended for preventing a sheet from hanging down during vacuum molding, that is, for improving moldability with vacuum molding. Thus, there is no possibility of adopting a mode in which a metal oxide having a poor kneadability is blended in a large amount so that moldability of the sheet is decreased on the contrary.

In the polyester resin composition of PTL 3, a blending amount of the filler is 10% to 70% by mass at first glance. However, the filler which is blended in the examples is only talc or calcium carbonate, and a metal oxide having a high thermal conductive property is not actually blended. In addition, as specific examples of the filler described in PTL 3, in a similar manner to PTL 2, those having a relatively good kneadability with a resin, and those having a poor kneadability with a resin are enumerated together. Thus, it is obvious that among blending amounts of the filler, for example, a blending amount range as much as 50% to 70% by mass means a range in a case where talc, calcium carbonate, or the like having a relatively good kneadability with a resin is used. Even in a case where talc or calcium carbonate is blended as in the examples of PTL 3, a thermal sensation of contents is difficult to feel, and a sense of weight and a sense of stability are also insufficiently exhibited. In addition, since one of the objects of PTL 3 is to achieve easy disposal, there is no possibility of adopting a mode in which a metal oxide which is not necessarily preferable from the viewpoint of disposal is blended in a large amount.

In the thermoplastic resin composition of PTL 4, a blending amount of the inorganic filler is 1% to 60% by mass at first glance. However, the inorganic filler which is blended in the examples is only talc or mica, and a metal oxide having a high thermal conductive property is not actually blended. In addition, as specific examples of the inorganic filler described in PTL 4, in a similar manner to PTL 2, those having a relatively good kneadability with a resin, and those having a poor kneadability with a resin are enumerated together. Thus, it is obvious that among blending amounts of the inorganic filler, for example, a blending amount range as much as 50% to 60% by mass means a range in a case where talc, mica, or the like having a relatively good kneadability with a resin is used. Even in a case where talc or mica is blended as in the examples of PTL 4, a thermal sensation of contents is difficult to feel, and a sense of weight and a sense of stability are also insufficiently exhibited. In addition, since one of the objects of PTL 4 is to improve a surface appearance, there is no possibility of adopting a mode in which a metal oxide having a poor kneadability is blended in a large amount so that the appearance may be adversely affected on the contrary.

As described above, PTLs 1 to 4 do not suggest at all that a metal oxide having a high thermal conductive property is blended in a large amount. In addition, even in a case where resin molded bodies of PTLs 1 to 4 in which a filler is blended are used as a piece of tableware or container, a thermal sensation of contents is difficult to feel, and a sense of weight and a sense of stability are insufficiently exhibited.

In addition, in order to cause a metal oxide having a poor kneadability with a resin to be blended in a large amount, it is difficult to do so with methods in the related art, and some measures to improve kneadability are necessary.

The present invention has been made to solve the above-described problems in the related art. That is, a first object of the present invention is to provide a thermally conductive composition which is easy to feel a thermal sensation of contents and sufficiently exhibits a sense of weight and a sense of stability in a case of being used for a specific application, and a preferable application of the composition. A second object of the present invention is to provide a thermally conductive composition which allows a large amount of a metal oxide to be blended due to improved kneadability between a thermoplastic resin and a metal oxide, and, as a result, is easy to feel a thermal sensation of contents and sufficiently exhibits a sense of weight and a sense of stability in a case of being used for a specific application, and a preferable application of the composition.

Solution to Problem

As a result of intensive studies to solve the above problems, the present inventors have found that it is very effective to blend a specific amount of a thermally conductive metal oxide (B) with a thermoplastic resin (A). Furthermore, the present inventors have found that the obtained composition is suitable for various specific applications, and have completed a first aspect of the present invention. In addition, the present inventors have found that kneadability between the thermoplastic resin (A) and the metal oxide (B) is remarkably improved in a case where a specific amount of a modified polyolefin-based wax (C) is blended. Furthermore, the present inventors have found that the obtained composition is suitable for various specific applications, and have completed a second aspect of the present invention. That is, the present invention is specified by the following matters.

[1] A thermally conductive composition, comprising:
10 to 50 parts by mass of a thermoplastic resin (A); and
50 to 90 parts by mass of a metal oxide (B) (a total of the thermoplastic resin (A) and the metal oxide (B) being 100 parts by mass).

[2] A thermally conductive composition, comprising:
a thermoplastic resin (A); and
a metal oxide (B),
wherein a modified polyolefin-based wax (C) is further contained in an amount of 0.1 to 20 parts by mass with respect to 100 parts by mass of the thermoplastic resin (A).

[3] The thermally conductive composition according to [1], further comprising:
0.1 to 20 parts by mass of a modified polyolefin-based wax (C) with respect to 100 parts by mass of the thermoplastic resin (A).

[4] The thermally conductive composition according to [1] or [2],
wherein the thermoplastic resin (A) includes a polyolefin-based resin.

[5] The thermally conductive composition according to [1] or [2],
wherein a melt flow rate (MFR) of the thermoplastic resin (A) measured at 230° C. under a load of 2.16 kg according to ASTM D1238E is 11 to 100 g/10 min.

[6] The thermally conductive composition according to [1] or [2],
wherein the metal oxide (B) includes magnesium oxide.

[7] The thermally conductive composition according to [1] or [2],
wherein a thermal conductivity of the metal oxide (B) is 1 to 500 W/mK.

[8] The thermally conductive composition according to [1] or [2],
wherein an average particle diameter of the metal oxide (B) is 0.1 to 100 μm.

[9] The thermally conductive composition according to [1] or [2],
wherein a thermal conductivity of the thermally conductive composition is 0.5 to 5 W/mK.

[10] A container, comprising:
the thermally conductive composition according to [1] or [2].

[11] A piece of tableware, comprising:
the thermally conductive composition according to [1] or [2].

[12] A heat dissipating member, comprising:
the thermally conductive composition according to [1] or [2].

[13] A water-circulating structure material, comprising:
the thermally conductive composition according to [1] or [2].

[14] An electronic device casing, comprising:
the thermally conductive composition according to [1] or [2].

[15] A timepiece exterior material, comprising:
the thermally conductive composition according to [1] or [2].

[16] A tumbler comprising:
the thermally conductive composition according to [1] or [2].

[17] A commodity for daily use, comprising:
the thermally conductive composition according to [1] or [2].

Advantageous Effects of Invention

In a first aspect of the present invention, there is provided a thermoplastic resin composition that contains 10 to 50 parts by mass of a thermoplastic resin (A) and 50 to 90 parts by mass of a metal oxide (B) (a total of the thermoplastic resin (A) and the metal oxide (B) being 100 parts by mass). In the first aspect of the present invention, since the metal oxide (B) (preferably a thermally conductive metal oxide) is blended in a specific amount which is a relatively large amount, with the thermoplastic resin (A), the composition has a drastically improved thermal conductive property, and also has an increased mass. In a case where such a thermally conductive composition is used, for example, for an application as a piece of tableware or container, a thermal sensation of contents such as a cooked food is sufficiently transferred so that it is possible to enjoy a meal such as a hot cooked food and a cold drink, and furthermore, a sense of weight and a sense of stability are also sufficiently exhibited in a case of being held by hand. Due to having an excellent thermal conductive property, such a thermally conductive composition is also suitable for an application as a heat dissipating member (for example, a heat dissipating sheet). In addition, such a thermally conductive composition is also suitable for an application as a water-circulating structure material, an electronic device casing, a timepiece exterior material, a tumbler, and a commodity for daily use.

In a second aspect of the present invention, there is provided a thermally conductive composition that contains a thermoplastic resin (A) and a metal oxide (B), in which a modified polyolefin-based wax (C) is further contained in an amount of 0.1 to 20 parts by mass with respect to 100 parts by mass of the thermoplastic resin (A). In the second aspect of the present invention, since a specific amount of the modified polyolefin-based wax (C) is blended, kneadability between the thermoplastic resin (A) and the metal oxide (B) is remarkably improved, and as a result, the metal oxide (B) can be blended in a relatively large amount with the thermoplastic resin (A), so that the composition has a drastically improved thermal conductive property and also has an increased mass. In a case where such a thermally conductive composition is used, for example, for an application as a piece of tableware or container, a thermal sensation of contents such as a cooked food is sufficiently transferred so that it is possible to enjoy a meal such as a hot cooked food and a cold drink, and furthermore, a sense of weight and a sense of stability are also sufficiently exhibited in a case of being held by hand. Due to having an excellent thermal conductive property, such a thermally conductive composition is also suitable for an application as a heat dissipating member (for example, a heat dissipating sheet). In addition, such a thermally conductive composition is also suitable for an application as a water-circulating structure material, an electronic device casing, a timepiece exterior material, a tumbler, and a commodity for daily use.

BRIEF DESCRIPTION OF DRAWING

The FIGURE is a photograph showing states of test pieces after a flame retardancy test for Example 2 and Comparative Example 2.

DESCRIPTION OF EMBODIMENTS

<Thermoplastic Resin (A)>

A type of the thermoplastic resin (A) used in the present invention is not particularly limited, and, for example, various thermoplastic resins such as a polyolefin-based resin and a polyester-based resin can be used. Two or more thermoplastic resins may be used in combination. Among these, a polyolefin-based resin and a polyester-based resin are preferable, and a polyolefin-based resin is more preferable.

Specific examples of the polyolefin-based resin include an ethylene-based resin and a propylene-based resin. In particular, a propylene-based resin is preferable. The propylene-based resin may be a propylene homopolymer or a copolymer of propylene and another α-olefin. In particular, a copolymer of propylene and another α-olefin is preferable. This copolymer may be a block copolymer or a random copolymer.

As specific examples of the other α-olefin copolymerized with propylene, ethylene and an α-olefin having 4 to 20 carbon atoms such as ethylene, 1-butene, 1-pentene, 1-hexene, 4-methyl-1-pentene, 1-octene, 1-decene, 1-dodecene, 1-tetradodecene, 1-hexadodecene, 1-octadodecene, 1-eicosene, 2 methyl-1-butene, 3-methyl-1-butene, 3,3-dimethyl-1-butene, diethyl-1-butene, trimethyl-1-butene, 3-methyl-1-pentene, ethyl-1-pentene, propyl-1-pentene, dimethyl-1-pentene, methyl ethyl-1-pentene, diethyl-1-hexene, trimethyl-1-pentene, 3-methyl-1-hexene, dimethyl-1-hexene, 3,5,5-trimethyl-1-hexene, methyl-ethyl-1-heptene, trimethyl-1-heptene, ethyl-1-octene, and methyl-1-nonene are mentioned. Among these, ethylene and an α-olefin having 4 to 8 carbon atoms are preferable, and ethylene, 1-hexene, and 1-octene are more preferable.

As preferable specific examples of the copolymer of propylene and another α-olefin, a propylene/ethylene copolymer, a propylene/1-butene copolymer, a propylene/1-pentene copolymer, a propylene/1-hexene copolymer, a propylene/1-octene copolymer, a propylene/ethylene/1-butene copolymer are mentioned. Among these, a propylene/ethylene copolymer is particularly preferable.

In the thermoplastic resin (A) such as a polyolefin-based resin, a melt flow rate (MFR) measured at 230° C. under a load of 2.16 kg according to ASTM D1238E is preferably 11 to 100 g/10 min, and more preferably 20 to 90 g/10 min.

In a case where the thermoplastic resin (A) is a propylene/ethylene block copolymer, an amount of a room-temperature decane soluble part of the propylene/ethylene block copolymer is preferably equal to or more than 8% by weight and equal to or less than 35% by weight, and more preferably equal to or more than 8% by weight and equal to or less than 28% by weight. In addition, an intrinsic viscosity [η] of the room-temperature decane soluble part is preferably equal to or more than 1.0 dl/g and equal to or less than 10.0 dl/g. In addition, an ethylene amount of the room-temperature decane soluble part is preferably equal or more than 33% by mol and equal to or less than 48% by mol, and more preferably equal to or more than 37% by mol and equal to or less than 43% by mol.

A melting point of the thermoplastic resin (A) such as a polyolefin-based resin measured by a differential scanning calorimeter (DSC) according to JIS K7121 is preferably 130° C. to 170° C., more preferably 130° C. to 165° C., and particularly preferably 135° C. to 160° C.

In a case where the thermoplastic resin (A) is a propylene homopolymer, a preferable MFR is as described above, and a melting point is preferably 155° C. to 170° C., and more preferably 158° C. to 165° C.

In a case where the thermoplastic resin (A) is a propylene/ethylene random copolymer, an ethylene amount of the propylene/ethylene random copolymer is preferably 1.9% to 5.4% by mass, and more preferably 2.0% to 4.8% by mass. In addition, a crystalline melting point of the propylene/ethylene random copolymer measured by a differential scanning calorimeter (DSC) according to JIS K7121 is preferably 130° C. to 150° C., more preferably 130° C. to 145° C., and particularly preferably 135° C. to 145° C.

For the propylene/ethylene block copolymer and the propylene/ethylene random copolymer, one type thereof may be used alone or two or more types of copolymers may be used in combination. For example, two or more types of copolymers can be mixed for MFR adjustment.

The propylene/ethylene block copolymer can be produced, for example, by polymerizing propylene with an olefin polymerization catalyst containing a solid titanium catalyst component and an organometallic compound catalyst component, and further copolymerizing propylene and ethylene. As the solid titanium catalyst component, for example, a known solid titanium catalyst component containing titanium, magnesium, halogen, and, if necessary, an electron donor can be used. As the organometallic compound catalyst component, for example, an organoaluminum compound, an alkyl complex compound of a Group 1 metal and aluminum, an organometallic compound of a Group 2 metal, and the like can be used, and an organoaluminum compound is particularly preferable.

A room-temperature n-decane insoluble part that constitutes the propylene/ethylene block copolymer is mainly composed of a propylene polymer component. On the other hand, the room-temperature n-decane soluble part is mainly composed of a propylene/ethylene copolymer rubber component. Therefore, the propylene/ethylene block copolymer can be obtained by continuously carrying out the following two polymerization steps (polymerization step 1 and polymerization step 2).

[Polymerization Step 1]

A step of polymerizing propylene in the presence of a solid titanium catalyst component to produce a propylene polymer component (propylene polymer production step).

[Polymerization Step 2]

A step of copolymerizing propylene and ethylene in the presence of a solid titanium catalyst component to produce a propylene-ethylene copolymer rubber component (copolymer rubber production step).

It is preferable that the propylene/ethylene block copolymer is produced by such a production method, and it is more preferable that the polymerization step 1 is carried out in a former stage and the polymerization step 2 is carried out in a latter stage. In addition, each polymerization step (polymerization step 1, polymerization step 2) can be carried out using two or more polymerization tanks. A content of a decane soluble part in the block copolymer may be adjusted, for example, with polymerization time (residence time) in the step 1 and the step 2.

For the propylene/ethylene random copolymer, as a polymerization catalyst, for example, a titanium-based Ziegler catalyst may be used or a metallocene catalyst may be used. In addition, in the production of a block or random copolymer, it is also possible to introduce a chain transfer agent represented by hydrogen gas. With respect to amounts of raw material monomers, an introduction amount of the chain transfer agent can be increased to increase MFR, or can be decreased to decrease MFR.

The thermoplastic resin (A) used in the present invention may be a thermoplastic resin composition containing plural types of resins. As a preferable mode of such a case, a polyolefin compound containing a crystalline olefin polymer (A-1) and an ethylene/α-olefin copolymer (A-2) can be mentioned. More preferably, the mode is a polypropylene compound in which the crystalline olefin polymer (A-1) is a propylene-based polymer.

The component (A-1) is not particularly limited as long as the component (A-1) is an olefin polymer having crystallinity, and is preferably a propylene-based polymer. As such a propylene-based polymer and a component (A-2) as described later, for example, components disclosed in Japanese Patent Application Laid-Open No. 2010-190407 and Pamphlet of International Publication No. 2014/046086 can be mentioned. More specifically, examples of the component (A-1) can include the above-mentioned propylene homopolymers and block copolymers. In a case where the component (A-1) is a propylene-based polymer, preferable MFR and melting point are the same as above.

The component (A-2) may be a copolymer using at least ethylene and another α-olefin, or may be a copolymer using also a non-conjugated polyene. Specifically, for example, an ethylene/α-olefin random copolymer, an ethylene/α-olefin/non-conjugated polyene copolymer can be mentioned.

The ethylene/α-olefin random copolymer is preferably a copolymer of ethylene and an α-olefin having 3 to 20 carbon atoms, and preferably exhibits properties as an elastomer. As specific examples of the α-olefin having 3 to 20 carbon atoms, propylene, 1-butene, 1-pentene, 1-hexene, 4-methyl-1-pentene, 1-heptene, 1-octene, 1-decene, 1-dodecene, 1-tetradecene, 1-hexadecene, and 1-eicosene are mentioned. These α-olefins can be used alone or in combination. Among these, propylene, 1-butene, 1-hexene, and 1-octene are particularly preferable. A molar ratio of ethylene to the α-olefin (ethylene/α-olefin) is preferably 95/5 to 70/30, and more preferably 90/10 to 75/25. For the ethylene/α-olefin copolymer, an MFR at 230° C. under a load of 2.16 kg is preferably equal to or more than 0.1 g/10 min, and more preferably 0.5 to 5 g/10 min.

The ethylene/α-olefin/non-conjugated polyene copolymer is preferably an elastomer component which is a copolymer of ethylene, an α-olefin having 3 to 20 carbon atoms, and a non-conjugated polyene. As specific examples of the α-olefin having 3 to 20 carbon atoms, the same ones as described above are mentioned. As specific examples of the non-conjugated polyene, a non-cyclic diene such as 5-ethylidene-2-norbornene, 5-propylidene-5-norbornene, dicyclopentadiene, 5-vinyl-2-norbornene, 5-methylene-2-norbornene, 5-isopropyliden-2-norbornene, and norbornadiene; a chain-like non-conjugated diene such as 1,4-hexadiene, 4-methyl-1,4-hexadiene, 5-methyl-1,4-hexadiene, 5-methyl-1,5-heptadiene, 6-methyl-1,5-heptadiene, 6-methyl-1,7-octadiene, and 7-methyl-1,6-octadiene; and a triene such as 2,3-diisopropylidene-5-norbornene are mentioned. Among these, 1,4-hexadiene, dicyclopentadiene, and 5-ethylidene-2-norbornene are preferable. A molar ratio of ethylene, the α-olefin, and the non-conjugated polyene (ethylene/α-olefin/non-conjugated polyene) is preferably 90/5/5 to 30/45/25, and more preferably 80/10/10 to 40/40/20. For the ethylene/α-olefin/non-conjugated polyene random copolymer, an MFR at 230° C. under a load of 2.16 kg is preferably equal to or more than 0.05 g/10 min, and more preferably 0.1 to 10 g/10 min. As specific examples of the ethylene/α-olefin/non-conjugated polyene random copolymer, an ethylene/propylene/diene terpolymer (EPDM) is mentioned.

In a case where a total of the component (A-1), the component (A-2), and a component (B) in the polyolefin compound are set to be 100 parts by mass, a total of the component (A-1) and the component (A-2) is usually 15 to 50 parts by mass, preferably 15 to 40 parts by mass, and more preferably 15 to 30 parts by mass. A mass ratio of the component (A-1) to the component (A-2) is usually 100/0 to 0/100, preferably 90/10 to 10/90, and more preferably 80/20 to 20/80. A content of the metal oxide (B) is usually 50 to 85 parts by mass, preferably 60 to 85 parts by mass, and more preferably 70 to 85 parts by mass.

In addition to the ethylene/α-olefin copolymer which is the component (A-2), for example, a hydrogenated block copolymer such as a styrene-based thermoplastic elastomer or another elastic polymer may be used.

As described above, the thermoplastic resin (A) of the present invention is preferably a polyolefin-based resin, and particularly preferably a polypropylene-based resin. However, as long as an object of the present invention is not impaired, another resin such as the aforementioned polyester-based resin may be contained. A content of the other resin in 100% by weight of the entire thermoplastic resin (A) is preferably equal to or less than 5% by weight, more preferably equal to or less than 2% by weight, particularly preferably equal to or less than 1% by weight, and most preferably 0%.

A blending amount of the thermoplastic resin (A) is preferably 10 to 50 parts by mass, and more preferably 15 to 40 parts by mass, based on 100 parts by mass of a total of the thermoplastic resin (A) and the metal oxide (B).

<Metal Oxide (B)>

A type of the metal oxide (B) used in the present invention is not particularly limited, and any metal oxide having a higher thermal conductive property than the thermoplastic resin (A) may be used, and a thermally conductive metal oxide is preferably used. For example, various metal oxides such as magnesium oxide, aluminum oxide, titanium oxide, and ferrite can be used. Two or more of metal oxides may be used in combination. Among these, magnesium oxide, aluminum oxide, and titanium oxide are preferable from the viewpoint of an excellent thermal conductive property, and, furthermore, magnesium oxide is more preferable from the viewpoints of white color, ease of coloring, and inexpensiveness. In addition, it is preferable that the metal oxide (B) is subjected to a water resistance treatment. It is preferable that the metal oxide (B) is substantially free of a metal hydroxide and a hydrate thereof or a hydrate of a metal oxide. Specifically, a content of the metal hydroxide and the hydrate thereof or the hydrate of metal oxide in 100% by weight of the entire metal oxide (B) is preferably equal to or less than 1% by weight, more preferably equal to or less than 0.5% by weight, and particularly preferably equal to or less than 0.3% by weight.

A thermal conductivity of the metal oxide (B) is preferably 1 to 500 W/mK, more preferably 3 to 100 W/mK, and particularly preferably 5 to 80 W/mK.

An average particle diameter of the metal oxide (B) is preferably 0.1 to 100 μm, more preferably 0.1 to 50 μm, and particularly preferably 0.1 to 10 μm.

In addition, from the viewpoint of uniformity of thermal conduction and the like, it is preferable that an aspect ratio of the thermally conductive metal oxide (B) is small. Specifically, the aspect ratio is preferably less than 1.2, and more preferably less than 1.1.

A blending amount of the metal oxide (B) is preferably 50 to 90 parts by mass, and more preferably 60 to 85 parts by mass, based on 100 parts by mass of a total of the thermoplastic resin (A) and the metal oxide (B). In a case where such a blending amount is less than 50 parts by mass, a sufficient thermal conductive property may not be obtained, or a desired level of thermal conductive property may not be obtained. On the other hand, in a case where the blending amount exceeds 90 parts by mass, there is a problem that moldability deteriorates. It can be seen from results of Examples 1 to 4 as described later that a content proportion of the metal oxide (B) is within the above range, the thermal conductive property tends to be rapidly increased. This is considered to be due to the fact that in a case where the metal oxide is preferably in a well-dispersed state, a contact proportion between the metal oxides is increased, so that the metal oxide has a structure corresponding to a continuous layer and the thermal conductive property rises efficiently.

A mass ratio (B/A) of the thermoplastic resin (A) and the metal oxide (B) is preferably 1 to 9, more preferably 1.2 to 4, particularly preferably 1.4 to 4, and most preferably 1.5 to 4.

<Modified Polyolefin-Based Wax (C)>

The modified polyolefin-based wax (C) used in the present invention is a component for making it easy to knead a high content of the metal oxide (B) with the thermoplastic resin (A). It is considered that use of the modified polyolefin-based wax (C) causes aggregation of the metal oxide (B) in the thermoplastic resin (A) to be suppressed, so that kneading is easily done. In addition, it is considered that it becomes easy to knead a high content of the metal oxide (B) with the thermoplastic resin (A).

A type of the modified polyolefin-based wax (C) is not particularly limited, and a modified polyethylene-based wax and a modified polypropylene-based wax are preferable, with a modified polyethylene-based wax being more preferable.

The modified polyolefin-based wax (C) can be produced by a known method. Examples thereof include a method in which an unsaturated carboxylic acid compound is added to a low molecular weight ethylene-based polymer using a radical reaction in the absence or presence of a solvent, a method in which the addition is carried out in the presence of a Lewis acid, and a method in which the addition is carried out under a high temperature. A reaction temperature is 20° C. to 300° C., and particularly preferably 120° C. to 250° C. Since a melting point of the low molecular weight ethylene-based polymer is about 120° C., it is preferable to set the reaction temperature to equal to or higher than 120° C. from the viewpoint of making a reaction system uniform.

The unsaturated carboxylic acid compound is not particularly limited as long as the unsaturated carboxylic acid compound is a compound which has a reactive double bond and has a carboxylic acid group or a group derivable from the group, and, for example, a known unsaturated carboxylic acid and a derivative thereof such as an anhydride, an ester, an acid halide, an amide, and an imide can be used.

Examples of the unsaturated carboxylic acid include an unsaturated monocarboxylic acids such as acrylic acid, methacrylic acid, crotonic acid, and isocrotonic acid, and an unsaturated dicarboxylic acid such as maleic acid, fumaric acid, tetrahydrophthalic acid, itaconic acid, citraconic acid, norbornenedicarboxylic acid, and Nadic Acid™ (endocis-bicyclo[2.2.1]hept-5-ene-2,3-dicarboxylic acid). Use of the unsaturated carboxylic acid allows a modified hydrocarbon resin having a carboxylic acid group to be obtained. As the anhydride of unsaturated carboxylic acid, it is possible to use an anhydride of the unsaturated dicarboxylic acid. As specific examples thereof, maleic anhydride, itaconic anhydride, citraconic anhydride, tetrahydrophthalic anhydride, Nadic Anhydride™ (endocis-bicyclo[2.2.1]hept-5-ene-2,3-dicarboxylic acid anhydride), and the like are mentioned. Use of the anhydride of unsaturated carboxylic acid allows a modified hydrocarbon resin having a carboxylic anhydride group to be obtained. Maleic anhydride is particularly preferable.

As the ester of unsaturated carboxylic acid, an alkyl ester, a hydroxyalkyl ester, or a glycidyl ester of the unsaturated carboxylic acid can be used. As specific examples thereof, monomethyl maleate, dimethyl maleate, glycidyl maleate, hydroxyl (meth)acrylate, hydroxypropyl (meth)acrylate, glycidyl (meth)acrylate, and the like are mentioned. Use of the ester of unsaturated carboxylic acid allows a modified hydrocarbon resin having a carboxylic acid ester group to be obtained.

As specific examples of the halide of unsaturated carboxylic acid, malenyl chloride, dichloromaleic anhydride ($C_4Cl_2O_3$), and the like are mentioned. Use of the halide of unsaturated carboxylic acid allows a modified hydrocarbon resin having a halogen atom-containing carboxylic acid group to be obtained. As specific examples of the amide of unsaturated carboxylic acid, sulfamide, phthalamide, maleamide, and the like are mentioned. Use of the amide of unsaturated carboxylic acid allows a modified hydrocarbon resin having an amide group to be obtained. As specific examples of the imide of unsaturated carboxylic acid, maleimide, phthalimide, sulfimide, and the like are mentioned. Use of the imide of unsaturated carboxylic acid allows a modified hydrocarbon resin having an imide group to be obtained.

An acid value of the modified polyolefin-based wax (C) is preferably from 1 to 100 mg-KOH/g, and more preferably 10 to 90 mg-KOH/g.

A polystyrene-equivalent number average molecular weight (Mn) of the modified polyolefin-based wax (C) measured by gel permeation chromatography (GPC) is preferably 400 to 20,000.

A blending amount of the modified polyolefin-based wax (C) is preferably 0.1 to 20 parts by mass, more preferably 0.3 to 15 parts by mass, and particularly preferably 0.3 to 10 parts by mass, with respect to 100 parts by mass of the thermoplastic resin (A).

<Other Components>

As a preferred mode, a mode in which reinforcing fibers (F) are contained in the thermally conductive composition of the present application can be adopted. In a polyolefin compound containing the reinforcing fibers (F), the reinforcing fibers (F) manifest an effect of mainly improving mechanical properties such as strength. The reinforcing fibers (F) are not limited to a mode in which the reinforcing fibers (F) are combined with the component (A-1) and the component (A-2), and the reinforcing fibers (F) can also be combined with various thermoplastic resins (A) to the extent that an object of the present invention is not impaired. As specific examples of the reinforcing fibers (F), glass fibers, carbon fibers, magnesium sulfate fibers, polyester fibers, nylon fibers, kenaf fibers, bamboo fibers, and Jude fibers are mentioned. Among these, glass fibers and carbon fibers are preferable. An aspect ratio of the reinforcing fibers (F) is greater than 1. Specifically, the aspect ratio is equal to or more than 1.1, preferably equal to or more than 1.2, more preferably 1.2 to 10, particularly preferably 1.3 to 8, and most preferably 1.4 to 5.

The thermally conductive composition of the present invention may contain a filler other than the reinforcing fibers (F). As examples of such a filler, an inorganic filler such as talc, mica, calcium carbonate, magnesium hydroxide, ammonium phosphate, silicates, carbonates, and carbon black; and an organic filler such as wood flour, cellulose, rice flour, starch, and corn starch are mentioned. Among these, talc is most preferable from the viewpoint of balance among price, performance, handling property, supply stability, and the like.

Furthermore, depending on an application, various additives such as a plasticizer, a lubricant, an antioxidant, an ultraviolet absorber, a heat stabilizer, a pigment, a dye, an antistatic agent, an antibacterial agent, a flame retardant, a coupling agent, and a dispersant can be blended in the thermally conductive composition of the present invention to the extent that an object of the present invention is not impaired.

The thermally conductive resin composition of the present invention may be in a mode of an oil-extended product such as containing known oil. However, in particular, in applications where human hands often come in contact with such as casings of electronic devices or household electric appliances, furniture, and building materials which will be described later, it is preferable that substantially no oil is contained. Specifically, a content of oil in 100% by weight of the entire thermoplastic resin composition is preferably equal to or less than 5% by weight, more preferably equal to or less than 2% by weight, particularly preferably equal to or less than 1% by weight, and most preferably 0%.

<Thermally Conductive Composition>

The thermally conductive composition of the present invention can be produced by blending the above-mentioned components (A) and (B), and if necessary, optional components. The respective components may be sequentially blended in any order or may be mixed in a simultaneous manner. In addition, a multi-step mixing method in which some components are mixed and then the other components are mixed may be adopted.

As a method of blending the respective components, for example, a method of mixing or melt-kneading the respective components in a simultaneous or sequential manner using a mixing device such as a Banbury mixer, a single screw extruder, a twin-screw extruder, and a high-speed twin-screw extruder is mentioned.

The thermally conductive composition of the present invention thus obtained has an excellent thermal conductive property. Specifically, the thermal conductivity is usually 0.5 to 5 W/mK, preferably 0.6 to 5 W/mK, more preferably 0.6 to 3 W/mK, particularly preferably 0.6 to 2.5 W/mK, and most preferably 0.6 to 2 W/mK.

The thermally conductive composition of the present invention also has an excellent flame retardancy and may exhibit an excellent flame retardancy without using a flame retardant in combination. A factor which causes the thermally conductive composition of the present invention to have an excellent flame retardancy is not clear. However, the present inventors make a speculation as follows.

Due to the fact that the thermally conductive composition of the present invention has an excellent thermal conductive property, it is considered that, for example, even in a case of being exposed to a flame, a thermal energy tends to be dispersed, so that a rapid temperature rise is unlikely to occur, and thus an oxidation reaction of the thermoplastic resin (A) is unlikely to occur. In addition, since the thermoplastic resin (A) and the metal oxide (B) are well dispersed, the thermoplastic resin (A) is unlikely to be unevenly distributed, which is also considered to be a factor that makes the oxidation reaction of the thermoplastic resin (A) unlikely to occur.

The flame retardancy of the thermally conductive composition of the present invention can be evaluated by, for example, the method described in the ISO 3795 standard, or a method analogous thereto.

<Molded Body>

A method of molding the thermally conductive composition of the present invention is not particularly limited, and it is possible to use various known methods. Among these, an injection molding method with a high degree of freedom in shape is preferably applied.

A molded body obtained from the thermally conductive composition of the present invention can be, for example, used for various applications requiring a high thermal conductive property in various fields such as household goods. Specifically, a container in which food or the like is placed, a piece of tableware such as a fork, a knife, a spoon, and a dish, and the like are mentioned. These can be easily molded by injection molding and are very useful as a piece of tableware or container to replace ceramics from the viewpoints that it is easy to feel a thermal sensation of contents due to a high thermal conductive property and a sense of weight is obtained. In addition, it is also possible to expand to other applications using ceramics, such as a commodity for daily use such as a lamp shade and a vase, a structure material for a specific acoustic speaker (such as a high-end speaker), a water-circulating product such as a washbasin and a toilet bowl. Even in applications other than those using ceramics, in case of utilizing features that can impart a sense of weight and a sense of stability, expansion can, for example, be made to model/toy applications such as plastic models, furniture applications such as desks and chairs, musical instrument applications such as piano keyboards, tiles, artificial marble substitutes, building applications such as building materials, and the like. In addition, in a case of utilizing a sense of warmth and moldability, there is a possibility that it is also suitable as a filament for a 3D printer.

Besides, containers such as various bottles and jars which make full use of features such as a design property, a sense of stability, and a tactile sense can be mentioned. In particular, as suitable examples thereof, containers for beauty related products such as cosmetic products (cosmetic liquids, cosmetic creams, and the like), shampoo (also including body shampoo and the like), and rinse in which these performances tend to have a high influence on a commercial value can be mentioned. More specifically, a container having a shape such as a lidded container (including an airless container and the like), a (cosmetic) compact, a (cosmetic) pallet or a bottle can be mentioned. For such applications, in recent years, a plastic container such as a polyolefin container which is light in weight and excellent in impact resistance is used in most cases. However, a plastic is a material inadequate for the presentation of a high-class feeling in a visual sense, a tactile sense (including a thermal conductive property, a sense of weight, and the like), and the like. For the presentation of a high-class feeling, containers such as ceramics are suitable. However, for such containers, there are big problems that a degree of freedom is limited from the viewpoint of a design property and a mass production, and an impact resistance is low. For these containers using the composition of the present invention, it is possible to apply the same molding method as that for plastic products in the related art. Thus, due to not only having an excellent productivity and a design property but also having an excellent impact resistance as compared with ceramics so that the same sense of weight and thermal conductive property as those of ceramics are possessed, it can be considered that the composition of the present invention is suitable for the above applications.

In addition, the molded body obtained from the thermally conductive composition of the present invention is also useful as a heat dissipating member in applications requiring a high thermal conductive property. For example, the molded body is very useful as a heat dissipating member for a heat dissipating sheet in various electronic devices such as electronic parts, laptop computers, and mobile devices which require a high thermal conductive property. In addition, it can be expected that in a case where the thermally conductive composition of the present invention is applied to a part or all of casings of various electronic devices such as laptop computers and mobile devices and used in combination with a heat dissipating sheet, a heat dissipating performance of the electronic devices is further increased. Furthermore, by using the thermally conductive composition of the present invention for a part of casings of various electronic devices such as laptop computers and mobile devices, and using a material with a reduced metal oxide content or a material containing no metal oxide for other parts, for example, locations where hands often touch during operation, it is possible to produce a casing in which a possibility of occurrence of low-temperature burns or the like during a long-term operation can be decreased. Such a casing can be produced by, for example, a method of installing a plurality of resin injection gates in a mold for molding a casing and injecting a resin having a different composition for each gate.

As other applications, in a case of utilizing an excellent thermal conductive property, a degree of freedom in shape during molding, and a high impact strength, the molded body is also useful as an alternative material for a metallic casing. For example, it can be expected that expansion is made to casings and belts for timepieces and watches, parts of furniture (for example, metal handle portions), and exterior materials of household electric appliance products such as washing machines and refrigerators.

EXAMPLES

Hereinafter, the present invention will be described in more detail with reference to examples. However, the present invention is not limited to these examples. The respective materials used in the examples are as follows.

<Thermoplastic Resin (A)>

"b-PP": Propylene/ethylene block copolymer (amount of room-temperature decane soluble part (rubber content)=23% by mass, ethylene amount of room-temperature decane soluble part=40% by mol, intrinsic viscosity [$\eta$] of room-temperature decane soluble part=2.5 dl/g, MFR (230° C., 2.16 kg)=63 g/10 min)

"r-PP": Propylene/ethylene random copolymer (ethylene amount=2.7% by mass, MFR (230° C., 2.16 kg)=60 g/10 min)

The amount of room-temperature decane soluble part, the ethylene amount of room-temperature decane soluble part, and the intrinsic viscosity [$\eta$] and MFR of room-temperature decane soluble part in the propylene/ethylene block copolymer (b-PP), and the ethylene amount and MFR of the propylene/ethylene random copolymer (r-PP) were measured by the following methods.

(1) Amount of room-temperature decane soluble part

First, 5 g of a sample was accurately weighed, placed in a 1,000-mL eggplant-shaped flask, 1 g of BHT (dibutylhydroxytoluene, a phenol-based antioxidant) was further added, and a rotor and 700 mL of n-decane were charged.

Subsequently, a cooler was attached to the eggplant-shaped flask, and the flask was heated in an oil bath at 135° C. for 120 minutes while operating the rotor to dissolve the sample in n-decane. Next, contents of the flask were poured into a 1,000-mL beaker, the solution in the beaker was allowed to cool to room temperature (25° C.) for 8 hours or longer while stirring with a stirrer, and the precipitate was collected by a wire mesh. The filtrate was filtered through filter paper and poured into 2,000 ml of methanol contained in a 3,000 ml beaker, and this solution was left to stand at room temperature (25° C.) for 2 hours or longer while stirring with a stirrer. Next, the obtained precipitate was collected by a wire mesh, air-dried for 5 hours or longer, and dried at 100° C. for 240 to 270 minutes in a vacuum dryer, and an n-decane soluble part at 25° C. was recovered. A content (x) of the n-decane soluble part at 25° C. is represented by x (% by mass)=100×C/A, assuming that a sample weight is A g and a weight of the recovered n-decane soluble part is C g.

(2) Ethylene amount of room-temperature decane soluble part

Measurement was performed with $^{13}$C-NMR by an ordinary method.

(3) Intrinsic viscosity [η] of room-temperature decane soluble part

Measurement was performed with decalin at 135° C.

(4) Ethylene amount of r-PP

Measurement was performed with $^{13}$C-NMR by an ordinary method.

(5) Melt flow rate (MFR)

Measurement was performed according to ASTM D1238E under a condition of a temperature of 230° C. and a load of 2.16 kg.

<Thermally Conductive Metal Oxide (B)>

Magnesium oxide (trade name of STARMAG PSF-WR, manufactured by Konoshima Chemical Co., Ltd., average particle diameter=1.1 μm, thermal conductivity=45 to 60 W/mK)

<Modified Polyolefin-Based Wax (C)>

A modified polyolefin-based wax (trade name of Hi WAX 1105A, manufactured by Mitsui Chemicals, Inc., acid value=60 mg-KOH/g, number average molecular weight (Mn)=1500, density=940, degree of crystallization of 60%, melting point of 104° C., melt viscosity (140° C.)=150)

The acid value and the number average molecular weight (Mn) of the above-mentioned modified polyolefin-based wax were measured by the following methods.

(1) Acid Value

Measurement was performed according to JIS K5902.

(2) Number Average Molecular Weight (Mn)

In order to measure a number average molecular weight (Mn) of a polymer, GPC analysis was carried out under the following conditions.

Apparatus: Alliance GPC 2000 type (trade name, manufactured by Waters Corporation)

Column: TSKgel GMH6-HTx2 TSKgel GMH6-HTLx2 (trade names, all manufactured by Tosoh Corporation, inner diameter of 7.5 mm×length of 30 cm)

Column temperature: 140° C.

Mobile phase: Orthodichlorobenzene (containing 0.025% dibutylhydroxytoluene)

Detector: Differential refractometer

Flow rate: 1.0 mL/min

Sample concentration: 0.15% (w/v)

Injection volume: 0.5 mL

Sampling time interval: 1 second

Column calibration: Monodisperse polystyrene (manufactured by Tosoh Corporation)

Examples 1 to 4

The respective components were blended in blending proportions (parts by mass) as shown in Table 1 to obtain a thermally conductive composition. Specifically, first, with respect to the propylene/ethylene block copolymer (b-PP) or the propylene/ethylene random copolymer (r-PP) as the thermoplastic resin (A), Hi-WAX as the modified polyolefin-based wax (C) and magnesium oxide as the thermally conductive metal oxide (B) were kneaded using a kneading apparatus (Labo Plastomill (manufactured by Toyo Seiki Seisaku-Sho, Ltd.)) under a condition of 200° C. and 60 to 80 rpm, and strand-cut to obtain a pelletshaped thermally conductive composition.

The compositions of Examples 1 to 4 obtained as described above were injection-molded to obtain molded bodies (pieces of dish-shaped tableware having a diameter of about 20 cm and a thickness of about 4 cm). Such injection molding was carried out under a condition of molding temperature of 220° C. to 240° C., mold temperature of 80° C., injection time-holding time of 1 to 2 seconds (primary filling time of 14 seconds), and cooling time of 16 seconds.

In addition, injection-molded square plates of the thermally conductive compositions of the present invention obtained under the same condition can, for example, be used for various applications (sample materials and the like) including building materials and constituent materials of furniture, water-circulating members, casings of household electric appliance products, casings or heat dissipating sheets of electronic devices (personal computers, smartphones, and the like), casings of acoustic equipment (speakers and the like) and precision machines such as timepieces, members of plastic models, toys, and the like, design containers such as gardening containers and vases, containers for cosmetic products, and the like.

Next, Comparative Examples A1 to A5 for the first aspect of the present invention are described below.

Comparative Examples A1 and A2

The propylene/ethylene block copolymer (b-PP) or the propylene/ethylene random copolymer (r-PP) was prepared. In Comparative Examples A1 and A2, such a copolymer was not mixed with the thermally conductive metal oxide (B) and the modified polyolefin-based wax and used as it is for injection molding.

Comparative Examples A3 and A4

A thermally conductive composition was prepared in the same manner as in Examples 1 to 4 except that the respective components were blended in blending proportions (parts by mass) as shown in Table 1.

Comparative Example A5

For the blending proportions (parts by mass) as shown in Table 1, kneading was studied under various conditions which include performing kneading at 200° C. using a table-type kneader PBV-0.1 type apparatus, manufactured by Irie Shokai Co., Ltd. However, failure which is thought to be caused by too much amount of magnesium oxide occurred and kneading could not be done.

Next, comparative Examples B1 to B5 for the second aspect of the present invention are described below.

Comparative Examples B1 and B2

Kneading was attempted under various conditions which include performing kneading at 200° C. using a table-type kneader PBV-0.1, manufactured by Irie Shokai Co., Ltd., under the conditions as shown in Table 2 (in which the modified polyolefin-based wax (C) was not used). However, sufficient kneading could not be done.

The thermally conductive compositions of the examples and the comparative examples, and molded bodies thereof were evaluated by the following methods.

The results are shown in Tables 1 and 2.

(Thermal Conductivity)

A thermal conductivity of the thermally conductive composition was measured by a steady method thermal flowmeter method. Specifically, measurement was performed at a temperature of 30° C. according to ASTM E1530 using a measurement instrument GH-1 manufactured by ULVAC-Riko Inc.

placed on a table, further actually held by hand, and a sense of weight and a sense of stability were evaluated according to the following criteria.

"A": There were similar degrees of sense of weight and sense of stability to those of an ordinary ceramic dish.

"B": There were somewhat inferior sense of weight and sense of stability as compared with those of an ordinary ceramic dish.

"C": There were inferior sense of weight and sense of stability as compared with those of an ordinary ceramic dish.

(Kneadability)

Kneadability was evaluated according to the following criteria during a stage of performing melt-mixing using a kneader under a condition of a kneader rotation number of 60 to 80 rpm and a heating temperature of 200° C.

"A": Sufficient kneading was done.

"C": Kneading could not be done.

TABLE 1

| | | Example 1 | Example 2 | Example 3 | Example 4 | Comparative Example A1 | Comparative Example A2 | Comparative Example A3 | Comparative Example A4 | Comparative Example A5 |
|---|---|---|---|---|---|---|---|---|---|---|
| Thermoplastic resin (A) | r-PP | 20 | | 28.6 | | 100 | | 60 | | 5 |
| | b-PP | | 20 | | 31.3 | | 100 | | 60 | |
| Thermally conductive metal oxide (B) | | 80 | 80 | 71.4 | 68.7 | | | 40 | 40 | 95 |
| Modified polyolefin-based wax (C) | | 1 | 1 | 1 | 1 | | | 1 | 1 | 1 |
| Thermal conductivity | | 1.8 | 1.81 | 1.02 | 0.92 | 0.19 | 0.18 | 0.35 | 0.35 | *1 |
| Thermal sensation | | A | A | A | A | C | C | B | B | |
| Sense of weight | | A | A | A | A | C | C | B | B | |
| Sense of stability | | A | A | A | A | C | C | C | C | |

*1 Not possible to perform evaluation because kneading is not possible

TABLE 2

| | | Example 1 | Example 2 | Example 3 | Example 4 | Comparative Example B1 | Comparative Example B2 |
|---|---|---|---|---|---|---|---|
| Thermoplastic resin (A) | r-PP | 20 | | 28.6 | | 20 | |
| | b-PP | | 20 | | 31.3 | | 20 |
| Thermally conductive metal oxide (B) | | 80 | 80 | 71.4 | 68.7 | 80 | 80 |
| Modified polyolefin-based wax (C) | | 1 | 1 | 1 | 1 | 0 | 0 |
| Thermal conductivity | | 1.8 | 1.81 | 1.02 | 0.92 | *1 | *1 |
| Kneadability | | A | A | A | A | C | C |

*1 Not possible to perform measurement because kneading is not possible (Thermal Sensation)

A hot or cold cooked food was put on each of molded bodies (pieces of dish-shaped tableware) of Examples 1 to 4 and Comparative Examples 1 to 4 and actually used, and a thermal sensation was evaluated according to the following criteria.

"A": There was a similar degree of thermal sensation to that of an ordinary ceramic dish.

"B": There was a somewhat inferior thermal sensation as compared with that of an ordinary ceramic dish.

"C": There was an inferior thermal sensation as compared with that of an ordinary ceramic dish.

(Sense of Weight, Sense of Stability)

Molded bodies (pieces of dish-shaped tableware) of Examples 1 to 4 and Comparative Examples 1 to 4 were Example 5

First, as molding materials, the thermally conductive composition of Example 1 containing the metal oxide (B) and a resin composition (CPD) having the same composition as in Example 1 except that no metal oxide (B) was contained were prepared. Then, a melt of the resin composition (CPD) containing no metal oxide (B) was injected from an injection gate near a center portion of a mold for a smartphone casing, and a melt of the thermally conductive composition of Example 1 containing the metal oxide (B) was injected from the other gate. Clamping was carried out and then cooling was carried out, so that a casing part was molded. In a case of being used as a smartphone, the obtained casing part had a low thermal conductive property at a central portion where hands easily touch and had a high thermal conductive property at top and bottom portions.

(Flame Retardancy)

A flame retardancy test was carried out using a test piece obtained from each of the thermally conductive compositions obtained in Example 2 and Comparative Example 2, according to conditions of the ISO 3795 standard. As the test piece, a test piece which had been molded into a size of 200 mm×100 mm×2 mm by an ordinary method using a melt press molding apparatus and a predetermined mold was used. Specifically, after performing melting at 190° C. for 6 minutes, the thermally conductive composition was pressed and clamped for 4 minutes and cooled for 5 minutes using a water cooling device (10° C.). The FIGURE is a photograph showing states of the test pieces after the test. As shown in the FIGURE, the test piece of Example 2 exhibited almost no changes. However, the test piece of Comparative Example 2 exhibited a great deformation due to combustion.

INDUSTRIAL APPLICABILITY

The thermally conductive composition of the present invention can be used as a material for a molded body in various fields such as household goods and electronic parts as described in detail above, and, in particular, can be suitably used as a material for a container, a piece of tableware, a heat dissipating member, a water-circulating structure material, an electronic device casing, a timepiece exterior material, a tumbler, and a commodity for daily use.

The invention claimed is:

1. A thermally conductive composition, comprising:
   20 to 31.3 parts by mass of a polyolefin-based resin (A);
   68.7 to 80 parts by mass of a metal oxide (B),
   wherein a total of the polyolefin-based resin (A) and the metal oxide (B) being 100 parts by mass; and,
   0.1 to 20 parts by mass of a modified polyolefin-based wax (C) with respect to 100 parts by mass of the polyolefin-based resin (A),
   wherein the modified polyolefin-based wax (C) is modified by at least one compound selected from the group consisting of an unsaturated carboxylic acid and a derivative thereof, and,
   wherein the metal oxide (B) is magnesium oxide.

2. The thermally conductive composition according to claim 1, wherein a melt flow rate (MFR) of the polyolefin-based (A) measured at 230° C. under a load of 2.16 kg according to ASTM D1238E is 20 to 100 g/10 min.

3. The thermally conductive composition according to claim 1, wherein a thermal conductivity of the metal oxide (B) is 1 to 500 W/mK.

4. The thermally conductive composition according to claim 1, wherein an average particle diameter of the metal oxide (B) is 0.1 to 100 μm.

5. The thermally conductive composition according to claim 1, wherein the polyolefin-based resin (A) is at least one selected from the group consisting of an ethylene-based resin and a propylene-based resin.

6. The thermally conductive composition according to claim 1, wherein the modified polyolefin-based wax (C) has an acid value of 1 to 100 mg-KOH/g.

7. A container, comprising:
   the thermally conductive composition according to claim 1.

8. A piece of tableware, comprising:
   the thermally conductive composition according to claim 1.

9. A heat dissipating member, comprising:
   the thermally conductive composition according to claim 1.

10. A water-circulating structure material, comprising:
    the thermally conductive composition according to claim 1.

11. An electronic device casing, comprising:
    the thermally conductive composition according to claim 1.

12. A timepiece exterior material, comprising:
    the thermally conductive composition according to claim 1.

13. A tumbler cup comprising:
    the thermally conductive composition according to claim 1.

14. A commodity for daily use, comprising:
    the thermally conductive composition according to claim 1.

* * * * *